(12) United States Patent
Scott-Thomas et al.

(10) Patent No.: US 6,469,289 B1
(45) Date of Patent: Oct. 22, 2002

(54) AMBIENT LIGHT DETECTION TECHNIQUE FOR AN IMAGING ARRAY

(75) Inventors: John Scott-Thomas, Ottawa (CA); Alex Roustaei, La Jolla, CA (US); Paul Vulpoiu, Ottawa (CA)

(73) Assignee: Symagery Microsystems Inc., Ottawa (CA)

( * ) Notice: Subject to any disclaimer, the term of this patent is extended or adjusted under 35 U.S.C. 154(b) by 63 days.

(21) Appl. No.: 09/718,137

(22) Filed: Nov. 21, 2000

Related U.S. Application Data
(60) Provisional application No. 60/177,496, filed on Jan. 21, 2000.

(51) Int. Cl.[7] .............................................. H01L 27/00
(52) U.S. Cl. .............................. 250/208.1; 250/214 AL
(58) Field of Search ...................... 250/208.1, 214 AL, 250/214.1, 214 R; 348/294, 295, 297, 309; 257/290, 291, 431–435

(56) References Cited

U.S. PATENT DOCUMENTS

| | | |
|---|---|---|
| 3,991,299 A | 11/1976 | Chadima, Jr. et al. |
| 4,338,514 A | 7/1982 | Bixby |
| RE31,370 E | 9/1983 | Mashimo et al. |
| 4,471,228 A | 9/1984 | Nishizawa et al. |
| 4,538,060 A | 8/1985 | Sakai et al. |
| 4,677,287 A | 6/1987 | Ejima |
| 4,805,010 A | 2/1989 | Shroyer et al. |
| 4,945,418 A | 7/1990 | Mutoh |
| 4,970,379 A | 11/1990 | Danstrom |
| 5,335,075 A | 8/1994 | Komiya et al. |
| 5,491,330 A | 2/1996 | Sato et al. |
| 5,742,340 A | 4/1998 | Alves |
| 5,808,286 A | 9/1998 | Nukui et al. |
| 5,910,653 A | 6/1999 | Campo |
| 5,932,861 A | 8/1999 | Iwaguchi et al. |
| 5,986,705 A | 11/1999 | Shibuya et al. |
| 6,315,379 B1 * | 11/2001 | Adams et al. ................. 347/14 |

FOREIGN PATENT DOCUMENTS

| | | |
|---|---|---|
| EP | 0 221 545 B1 | 7/1992 |
| EP | 0 660 598 A1 | 6/1995 |
| WO | 96/03708 A1 | 2/1996 |
| WO | 99/57605 | 11/1999 |

OTHER PUBLICATIONS

Patent Abstracts of Japan, vol. 007, No. 072 (E–166), Mar. 25, 1983 & JP 57 212878 A (Nippon Denshin Denwa Kosha), Dec. 27, 1982 abstract.

* cited by examiner

*Primary Examiner*—Que T. Le
(74) *Attorney, Agent, or Firm*—Pearne & Gordon LLP

(57) ABSTRACT

This invention is directed to a method and apparatus for determining the level of ambient light impinging on a selected number of pixels in an imaging array where each pixel includes a photodiode. The ambient light may be determined by resetting the pixels in the array and by detecting current flow through the photodiodes in a selected number of the pixels as they are being reset. Alternately, the ambient light may be determined by resetting a selected number of the pixels in the array and by detecting current flow through the photodiodes in the selected number of the pixels as they are being reset. The photodiodes are reset by applying a reverse bias voltage across them and the current flow is detected by measuring the current flow through a resistance in parallel to the selected photodiodes. The selected number of pixels may be divided into one or more groups each having at least one pixel, and the pixels in each group may be arranged in specific patterns within the array. The array may be laid out in rows and columns, and the groups may be located in predetermined rows or columns. When only a selected number of pixels are reset and these pixels are divided into groups, the groups may be sequentially reset to permit differentiation between the groups.

54 Claims, 13 Drawing Sheets

AMBIENT LIGHT DETECTION TECHNIQUE FOR AN IMAGING ARRAY

This application claims the benefit of U.S. Provisional Patent Application Ser. No. 60/177,496 filed on Jan. 21, 2000.

FIELD OF THE INVENTION

The present invention relates to the field of image scanning devices and in particular to determining ambient light intensity for image scanning devices.

BACKGROUND OF THE INVENTION

In the imaging industry, scanners are expected to operate effectively under a wide range of ambient light. A number of solutions have been developed wherein ambient light is measured in order to control the scanning system. The sensing of ambient light may be done by an ambient light detection circuit which is separate from the imaging array, or ambient light can be detected through the use of the imaging array itself. The ambient light measurement is then used either to adjust the exposure time for the imaging array/lens, to set the gain of the image signal or to control the brightness of a light source.

U.S. Pat. No. 4,970,379 which issued on Nov. 13, 1990 to Danstrom discloses exposure/illumination control for a bar code scanner consisting of a controllable light source and an optical sensor that is independent of the scanner array. The optical sensor converts the light reflecting from the object to be scanned into an electrical signal representative of the ambient light. This signal is coupled to a comparator, which determines the illumination required by the scanner array, and then adjusts the power to the controllable light source accordingly. A major drawback of this method is that during low light conditions the light source will be driven by the comparator to generate bright illumination, which consumes a large amount of power. In a hand held device this is extremely detrimental, as most hand held devices have a self-contained power supply.

Other systems use the imaging array itself to determine ambient light levels which is then used to control exposure time. U.S. Pat. No. 4,471,228 which issued on Sep. 11, 1984 to Nishizawa et al., describes an image sensor consisting of non-destructive readout-type image cells, the sensor uses the array of image cells as both photo-detector cells for the measurement of ambient light and as image capturing cells for imaging an object. The imaging array is exposed to the object and an ambient light measurement run is made through previously selected imaging cells. The added value of the selected imaging cells is compared to a reference value to determine the exposure level required. The selected imaging cells are then erased, and an image scan of the object is performed with a controlled exposure time.

The shortcoming of this method is that it consists of too many steps. The multi-step process of using the array to measure ambient light and then forcing the array to be reset before the image is scanned, slows the process down. Additionally, the extra step requires an extra expenditure of power, which is a severe detriment in a hand-held device.

Another method using the imaging array is U.S. Pat. No. 4,338,514, which issued on Jul. 6, 1982 to Bixby, discloses a further method of controlling exposure time by operating a mechanical shutter in response to radiant energy impinging on the sensor array. The semiconductor array substrate current is monitored during the exposure of the imaging array to produce an integrated signal that is proportional to the exposure level of the array. The signal is compared to a threshold voltage and when it exceeds a threshold value the shutter is closed.

There are drawbacks to this method in that it requires additional processing steps in order to create an apparatus to monitor the substrate current. Specifically, the apparatus requires the addition of a layer of conductive material between the non-conductive base-plate and the semi-conductive substrate. While this type of process is typical in some CCD imagers, it would be a costly additional fabrication step in a CMOS imager.

A further system in which exposure time is adjusted is described in U.S. Pat. No. 5,986,705 which issued on Nov. 16, 1999 to Shibuya et al. A video camera is described having an image sensing device, an exposure adjustment apparatus which controls the gain of the amplifier to adjust the scanned output signal and further controls a drive pulse generator to control the exposure time of the sensing device. In one embodiment, the video camera controls exposure by capturing an image with the image sensing device, amplifying the output signal which is driven externally as well as being fed back into the exposure adjustment apparatus where the signal is compared to a reference. When the comparison indicates that the image is either overexposed, underexposed or without need of adjustment, control signals are sent to the drive pulse generator to adjust exposure time and to the amplifier to adjust the gain of the amplifier.

This method has several disadvantages, its iterative style of exposure control is only advantageous for a video camera. Controlling only exposure time and signal gain is limiting in terms of the range of light intensity under which the device would remain useful. Still cameras, bar-code readers and the like, would not find such a method useful as it would require additional circuitry to filter out the overexposed and underexposed images. Low-light conditions would be difficult for the device to image as it has no control over an external light source.

While each of the measurement methods has its merits, the measurement methods are inherently limited by either the addition of; extra circuitry, increasing cost and size; fabrication steps, increasing cost; time, slowing the overall performance of the imaging circuit.

Therefore, there is a need for an ambient light detector that is integrated with a scanning device without adding costly additional circuitry and that provides reliable ambient light detection without undue interference with the image capture process.

SUMMARY OF THE INVENTION

This invention is directed to a method and apparatus for determining the level of ambient light impinging on a pixel having a photodiode. The method comprises resetting the photodiode in the pixel and at the same time detecting the current flow through the photodiode as an indication of the ambient light level. The photodiode is reset by applying a reverse bias voltage across it and the current flow is detected by measuring the current flow through a resistance in parallel to the photodiode.

In accordance with another aspect, this invention is directed to a method and apparatus for determining the level of ambient light impinging on a selected number of pixels in an imaging array where each pixel includes a photodiode. The ambient light may be determined by resetting the pixels in the array and by detecting current flow through the photodiodes in a selected number of the pixels as they are being reset. Alternately, the ambient light may be determined by resetting a selected number of the pixels in the array and by detecting current flow through the photodiodes in the selected number of the pixels as they are being reset.

The selected number of pixels may be divided into one or more groups each having at least one pixel, and the pixels in each group may be arranged in specific patterns within the array. The array may be laid out in rows and columns, and the groups may be located in predetermined rows or columns. When only a selected number of pixels are reset and these pixels are divided into groups, the groups may be sequentially reset to permit differentiation between the groups.

In accordance with another aspect of this invention, an apparatus determines ambient light on an imaging array of light sensitive pixels where each has a photodiode and photodiode reset switch adapted to apply a predetermined reset voltage across the photodiode and further has one or more power rails each connected to one or more of the pixels for supplying power to them. The apparatus comprises current monitoring circuitry that measures current flow in the photodiodes of selected pixels as the photodiodes are being reset to provide an output signal representative of the ambient light.

With regard to a further aspect of this invention, the current monitoring circuitry and the imaging array may be integrated on the same die.

The current monitoring circuitry may further include one or more current monitors each connected to at least one of the power rails for monitoring the current flow in the photodiodes connected to the power rails and an analog-to-digital converter coupled to each of the current monitors to provide a digital output signal representative of the ambient light. The current monitor may be a current-to-voltage converter connected to a power rail through a resistance. The current-to-voltage converter may include an op-amp having an inverting input terminal coupled to the resistance, a non-inverting input terminal adapted to be coupled to a reference voltage and an output terminal, the output terminal being coupled to the inverting input terminal through a further resistance.

In accordance with an aspect of this invention, in an imaging array where the pixels are positioned in rows and columns, the power rails are may each be connected to a different group of the pixels located in a rows or a column. The power rails for the selected pixels may all be adapted to be connected to the same power supply directly. Alternately, the power rails may each be adapted to be connected to a power supply through a diode or they may each be adapted to be connected to a separate power supply.

With regard to a further aspect of this invention, the apparatus may further include a control for the pixel reset switches that will reset individual groups of pixels sequentially to allow the current in the reset photodiodes to be monitored individually and sequentially.

In accordance with another aspect, this invention may be integrated into a system for controlling the output signal during image capture of an object by an imager where the imager includes an imaging array of light sensitive pixels each having a photodiode and photodiode reset means adapted to apply a predetermined reset voltage across the photodiode, and one or more power rails each connected to one or more pixels on a die.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

CMOS image sensors are comprised of an array of light sensitive pixels integrated on a die. In operation, after the pixels have been reset, the signal generated by each pixel is proportional to the amount of charge collected by the pixel during an exposure or integration period. However, during the reset process for each pixel, a leakage current flows through the reset transistor and the photodiode in each pixel. The current flowing through the reverse biased photodiode is proportional to the level of photons impinging on the photodiode at that time. The level of ambient light present when an image is being captured by the image array can greatly influence the quality of the captured image; this is particularly important when the captured image is being used for image recognition in instances such as bar-code reading. The level of light present when an image is being captured may also influence the amount of amplification that the image signals require as they are being processed for image recognition.

Figure 1:
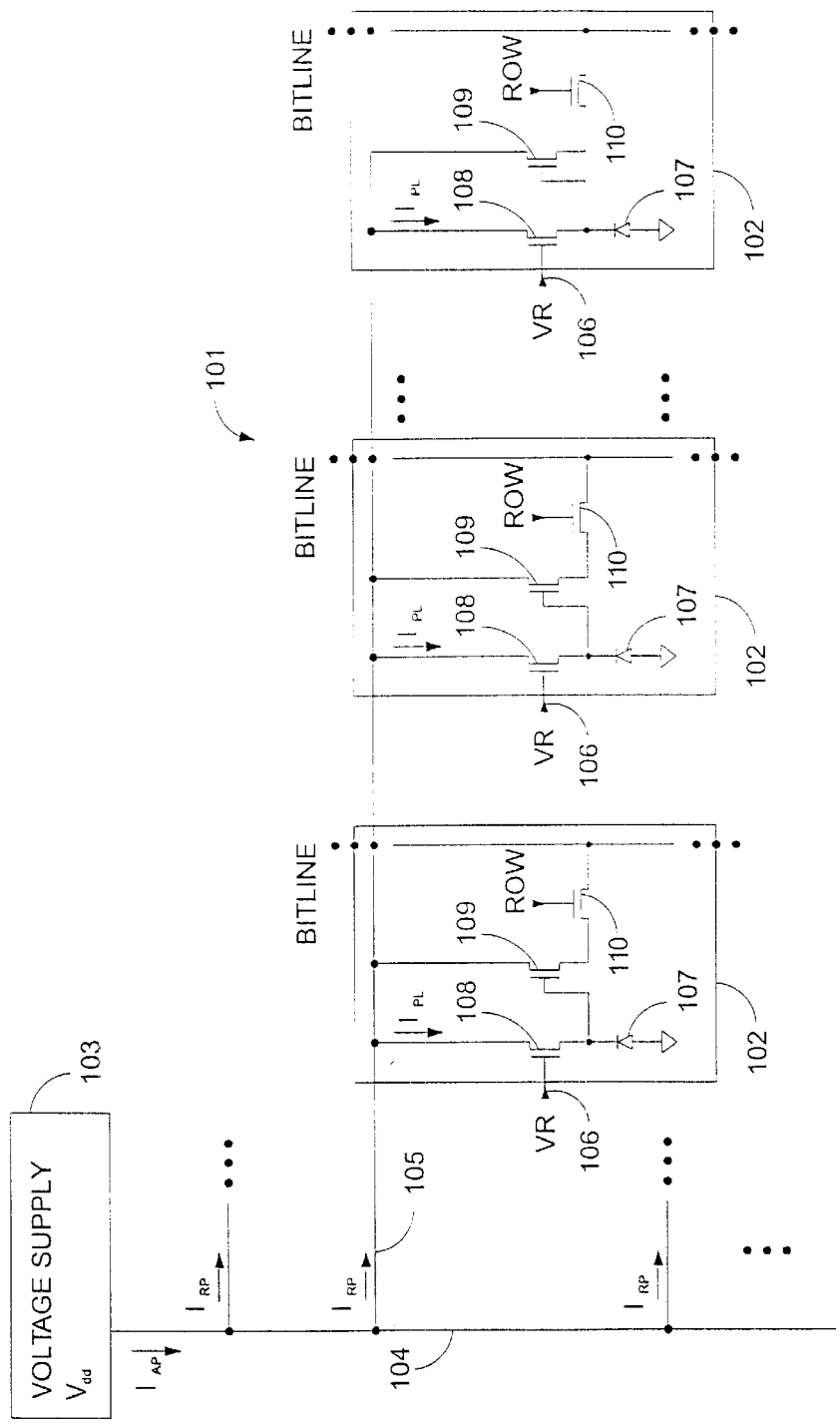
FIG. 1 schematically illustrates a voltage supply coupled to an array of light sensitive pixels as well as a pixel circuit that may be used in the present invention.

With reference to FIG. 1, an array 101 of light sensitive pixels 102 which are normally laid out in rows and columns, are powered by a stable voltage supply 103 providing an output voltage $V_{dd}$. One type of active pixel 102 that may be used in conjunction with the present invention is illustrated, however, the invention may be carried out in conjunction with other types of active pixels. Some pixels may use photodiodes such as p–n photodiodes, p–i–n photodiodes and Schottky photodiodes. The active pixel 102 illustrated consists of a reset transistor 108, a source-follower transistor 109, a p–n photodiode 107, and a row-selection transistor 110. In order to reset each pixel 102, a positive voltage signal $V_R$ is applied to the gate of the reset transistor 108 through reset line 106 turning the transistor 108 ON in order to apply the voltage $V_{dd}$ across the photodiode 107.

The pixels 102 are coupled to the voltage supply 103 through the array power rail 104 and a row power rails 105. As each pixel 102 is being reset, a current will flow through the pixel 102 as a pixel leakage current $I_{PL}$. The pixel leakage Current $I_{PL}$ flowing through the reverse-biased p–n photodiode 107 is proportional to the level of photons impinging on the photodiode 107. In effect, the intensity of light hitting the photodiode 107 can be measured by monitoring the pixel leakage current $I_{PL}$. The total current flowing through a row power rail 105 for all of the pixels 102 in that row during their reset is current $I_{RP}$, and the total current flowing through the power rail 104 for all of the pixels 102 in the array 101 during their reset is current $I_{AP}$. The, ambient light level impinging on the array 101 may be determined by measuring the current flowing through a selected number of pixels 102 while they are being reset.

Figure 2A:
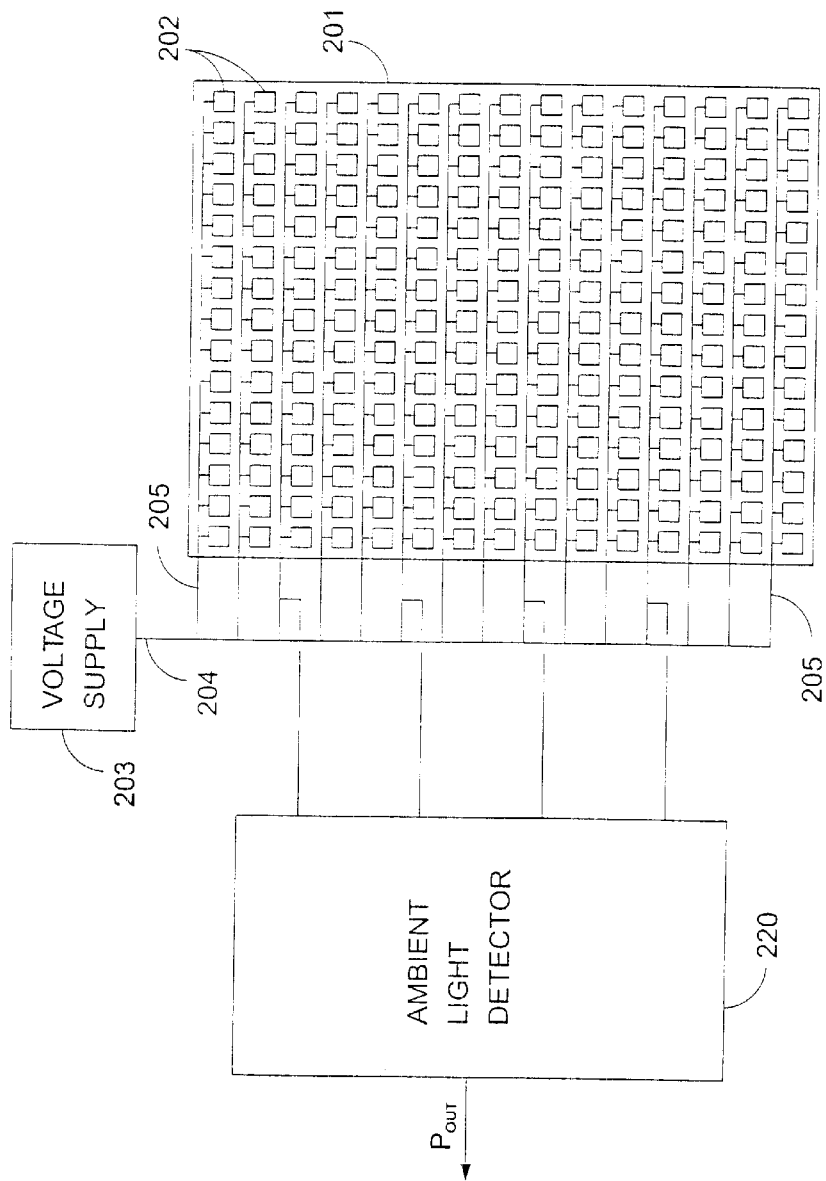
FIG. 2a illustrates a block diagram of the present invention.

An embodiment of the present invention for monitoring the pixel leakage current is illustrated in FIG. 2a wherein an ambient light detection circuit 220 is connected to the imaging array 201 in which the pixels 202 are laid out in rows and columns. It is preferred to have the ambient light detection circuit 220 integrated on the same die as the imaging array 201, however this is not essential for the proper operation of the present invention. The voltage supply 203 provides power to the imaging array 201 through the main power rail 204 which is coupled to the row power rails 205. Further, a number of selected individual row power rails 205 are each coupled to the ambient light detection circuit 220. The ambient light detection circuit 220 detects the individual currents flowing through each of the selected row rails 205, and outputs a signal $P_{OUT}$ representative the currents flowing. The output signal $P_{OUT}$ is a function of the currents $I_{RP}$ flowing to the pixels 202 in each of the selected row rails 205 and therefore can be used as a representation of the level of ambient light impinging on the pixels 202 in the array.

Figure 3A:
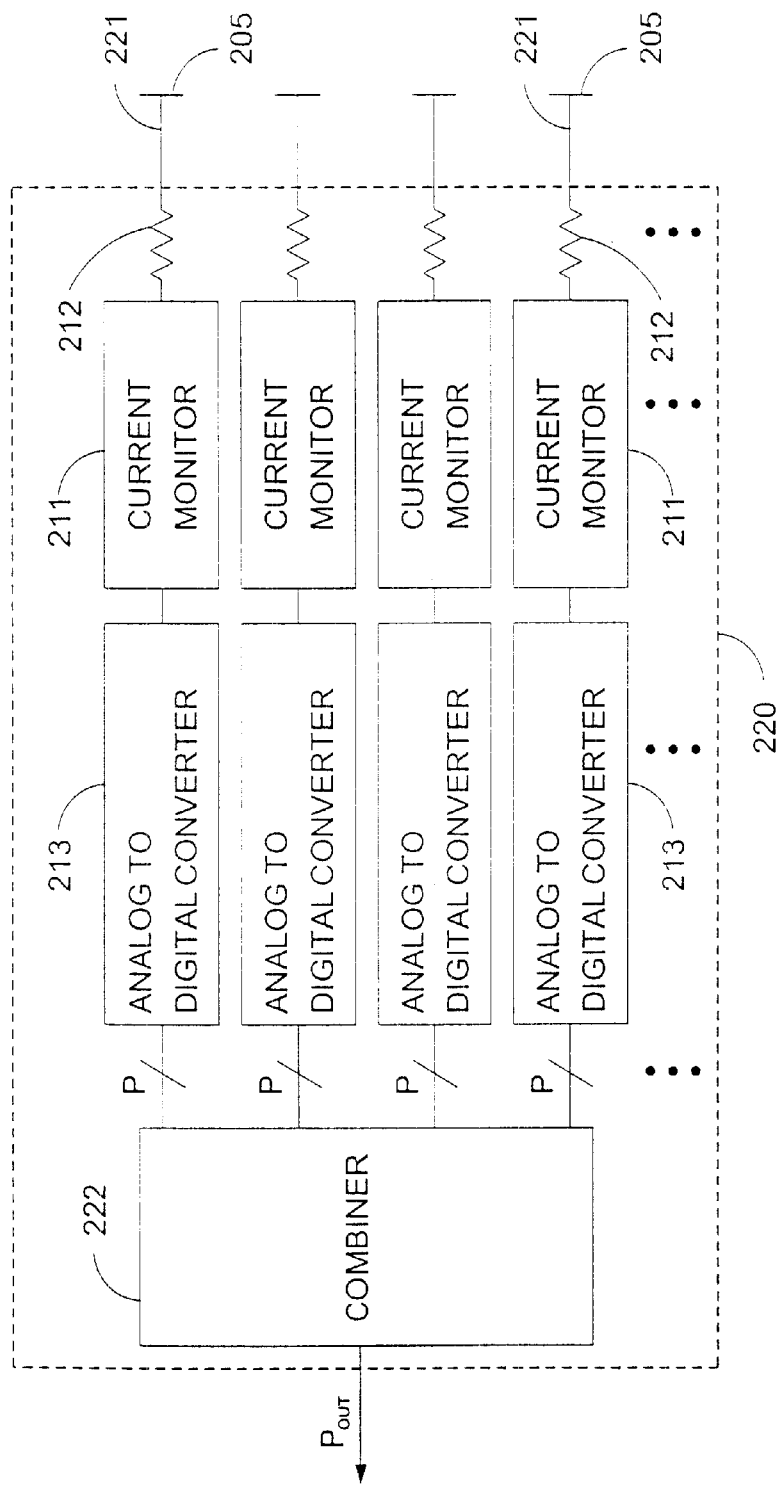
FIG. 3a illustrates a block diagram of the ambient light detector.

The ambient light detection circuit 220 shown in FIG. 3a illustrates one form that it may take to monitor currents flowing in one or more groups of pixels 202 in array 201. A number of inputs 221 for individual connection to a selected number of row rails 205, are each connected to a current monitor 211 through a small resistance 212 of value $R_{RM}$. Care must be taken to assure that the inputs 221 are isolated from one another such that the monitors 211 will only monitor the current in the row rails 205 to which they are connected. The current monitor 211 detects the current flowing through the small resistance 212, and outputs an analog signal representative of that current flow to an analog to digital converter 213. The analog to digital converter 213 transforms the analog signal into a digital signal P consisting of a number of bits. Analog to digital converters are well known to those skilled in the art, and hence shall not be described further here. The outputs P from the various analog to digital converters 213 are fed to a combiner 222 which may either combine all of the P signals into a single digital output signal $P_{OUT}$ or which may sequence the P signals into a string of digital outputs as signal $P_{OUT}$ representing the currents in the row rails 205 that had been selected.

Figure 3B:
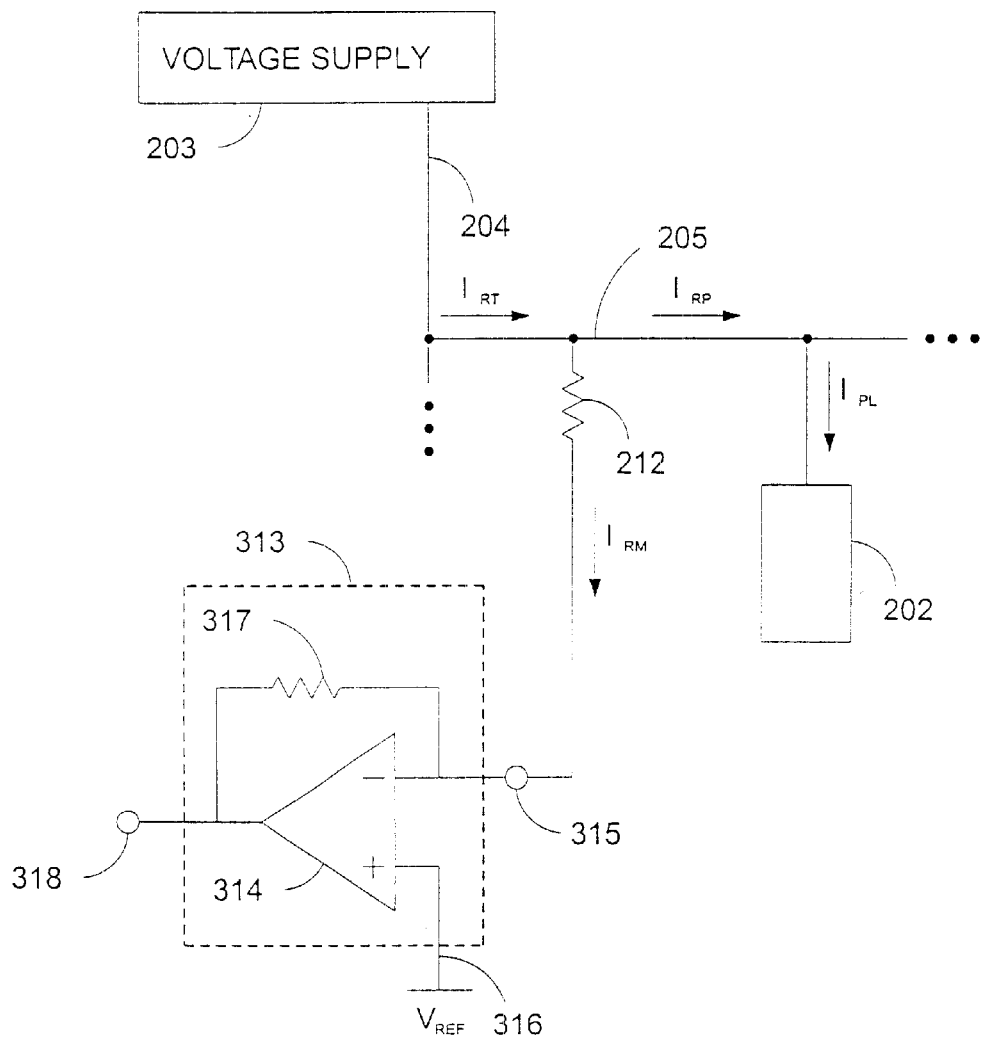
FIG. 3b illustrates a circuit that may be used as a current monitor in the ambient light detector.

FIG. 3b illustrates one form that the current monitor 211 may take. It consists basically of a current-to-voltage converter 313. The current $I_{RM}$ flowing through the small resistance 212 is equal to the total amount of current $I_{RT}$ flowing through the row power rail 205 less the total leakage currents $I_{RP}$ flowing into the pixels 202 connected to that particular row rail 205. The voltage at the inverting input 315 to the op-amp 314 is approximately equivalent to the reference voltage $V_{REF}$ applied to the non-inverting input 316 to the op-amp 314. This is possible by what is commonly known as a virtual ground between the inverting input 315 and non-inverting input 316 of the op-amp 314.

Due to the infinite impedance of the op-amp 314 all of the current $I_{RM}$ is forced to flow through the large resistance 317 of value $R_L$. This leads to an output voltage level $V_{OUT}$ represented by the following equation:

$$V_{OUT} = V_{REF} - (I_{RM} * R_L)$$

This establishes an output voltage level $V_{OUT}$ on output terminal 318 that is a function of the current $I_{RM}$ flowing through the small resistor 212, which is a function of the total leakage current $I_{RP}$ flowing through the pixels 202 in that particular row 205, which is a function of the amount of light impinging on the pixels 202 in that particular row 205. In effect the output voltage $V_{OUT}$ is directly proportional to the intensity of ambient light impinging on the pixels 202 in the selected row of the image sensor array 201. $V_{OUT}$ on the output 318 is then applied to the analog to digital converter 213.

Figure 2B:
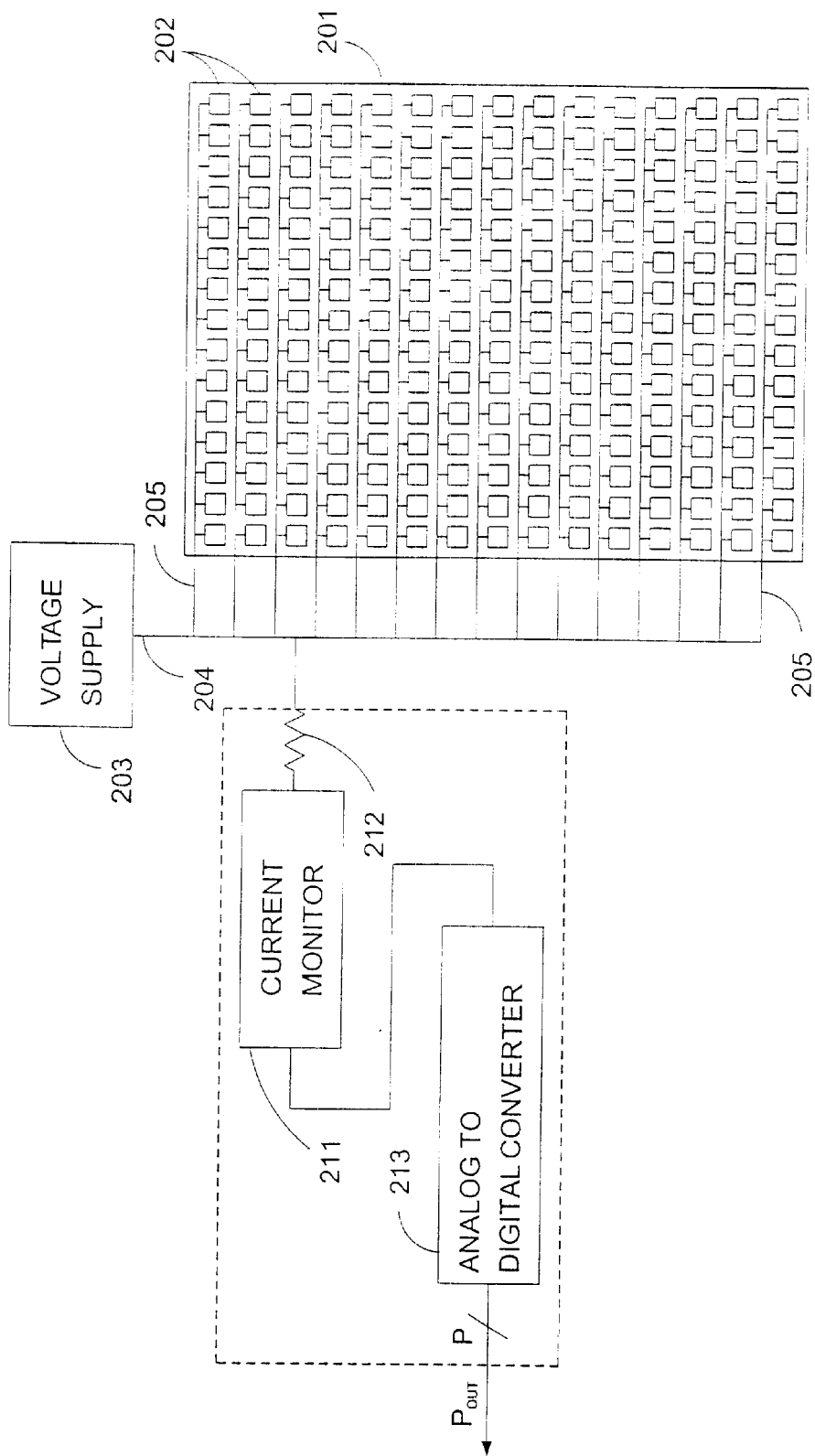
FIG. 2b illustrates a block diagram of the present invention having a single current monitor.

Alternate arrangements for monitoring the pixel leakage current(s) $I_{PL}$ of anywhere from one to all of the pixels 202 are also possible. For instance, as illustrated in FIG. 2b, a single current monitor 211 may be coupled to the array rail 204 so as to measure the total leakage current for all pixels 202 in the array 201 as they are being simultaneously reset. Referring to FIG. 1 for detail, the apparatus in this embodiment may be operated such that the reset transistors 108 for the pixels 102 is controlled to reset sequentially one or more pixels in selected rows or columns or groups of pixels 202 as illustrated in FIG. 2b. The resulting output signal $V_{OUT}$ will consist of sequential digital outputs representing ambient light from the different parts of the array which can be combined to provide an output signal representative of the ambient light on the array.

Figure 2C:
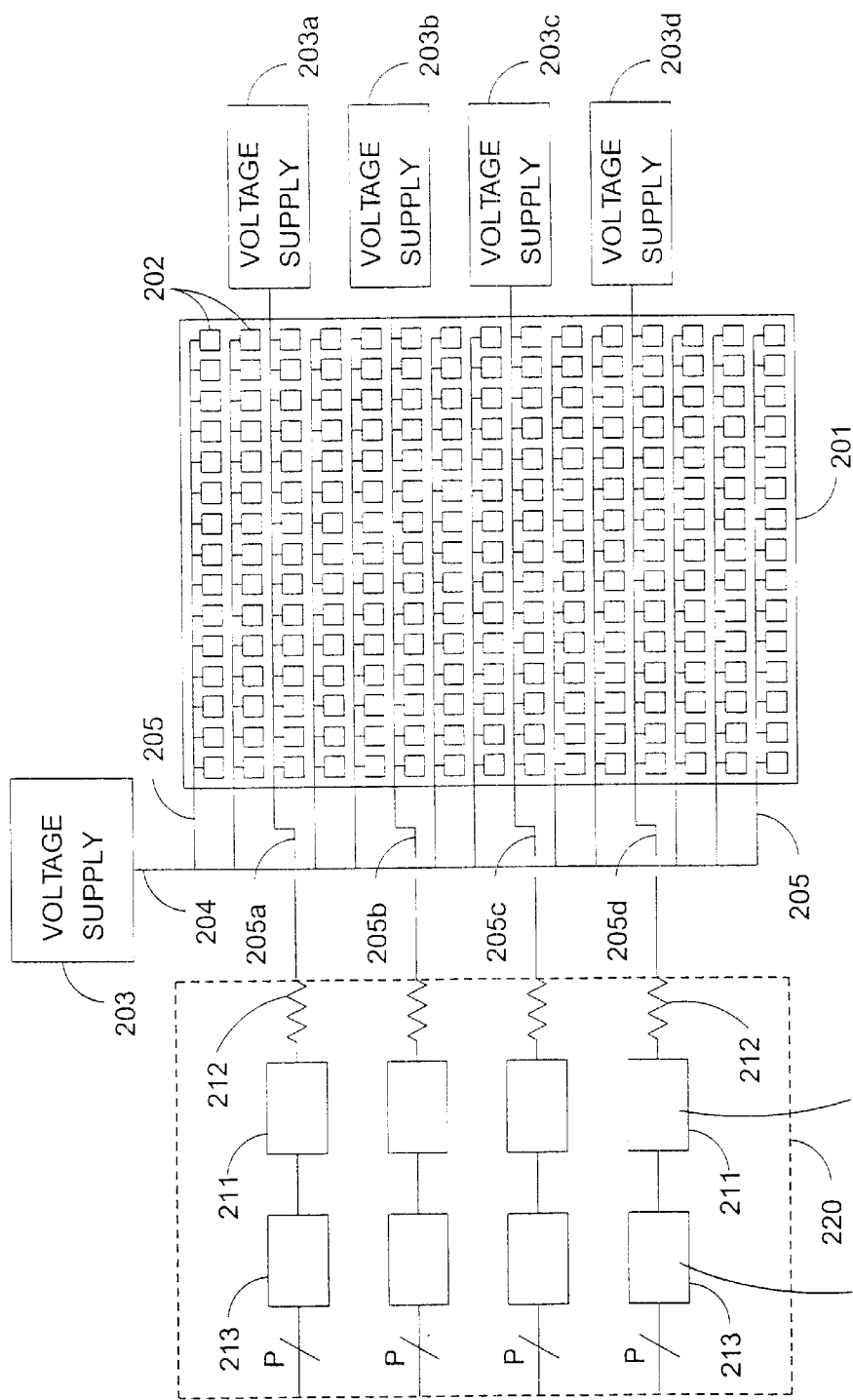
FIG. 2c illustrates a block diagram of the present invention having multiple voltage supplies.

It is usually preferred to measure the ambient light on the array 201 while the imaging scanner is operating normally where the pixels 202 in the array 201 are reset simultaneously during the resetting process; in this manner, the scanning process is interfered with the least. FIG. 2c is an embodiment of the present invention where selected rows 205 of pixels 202 to be monitored by the ambient light detection circuit 220 are individually connected to separate voltage sources 203. As illustrated row rails 205a, 205b, 205c and 205d are connected to voltage supplies 203a, 203b, 203c and 203d respectively. The remaining row rails 205 are connected to a further voltage supply 203. The ambient light detection circuit 220 includes a current monitor 211a, 211b, 211c and 211d and associated circuitry as described with respect to FIG. 3a for monitoring the current individually on each of the row rails 205a, 205b, 205c and 205d respectively. In this way, all of the pixels 202 in the entire array 201 can be reset simultaneously and at the same time the currents in row rails 205a, 205b, 205c and 205d can be monitored.

Figure 2D:
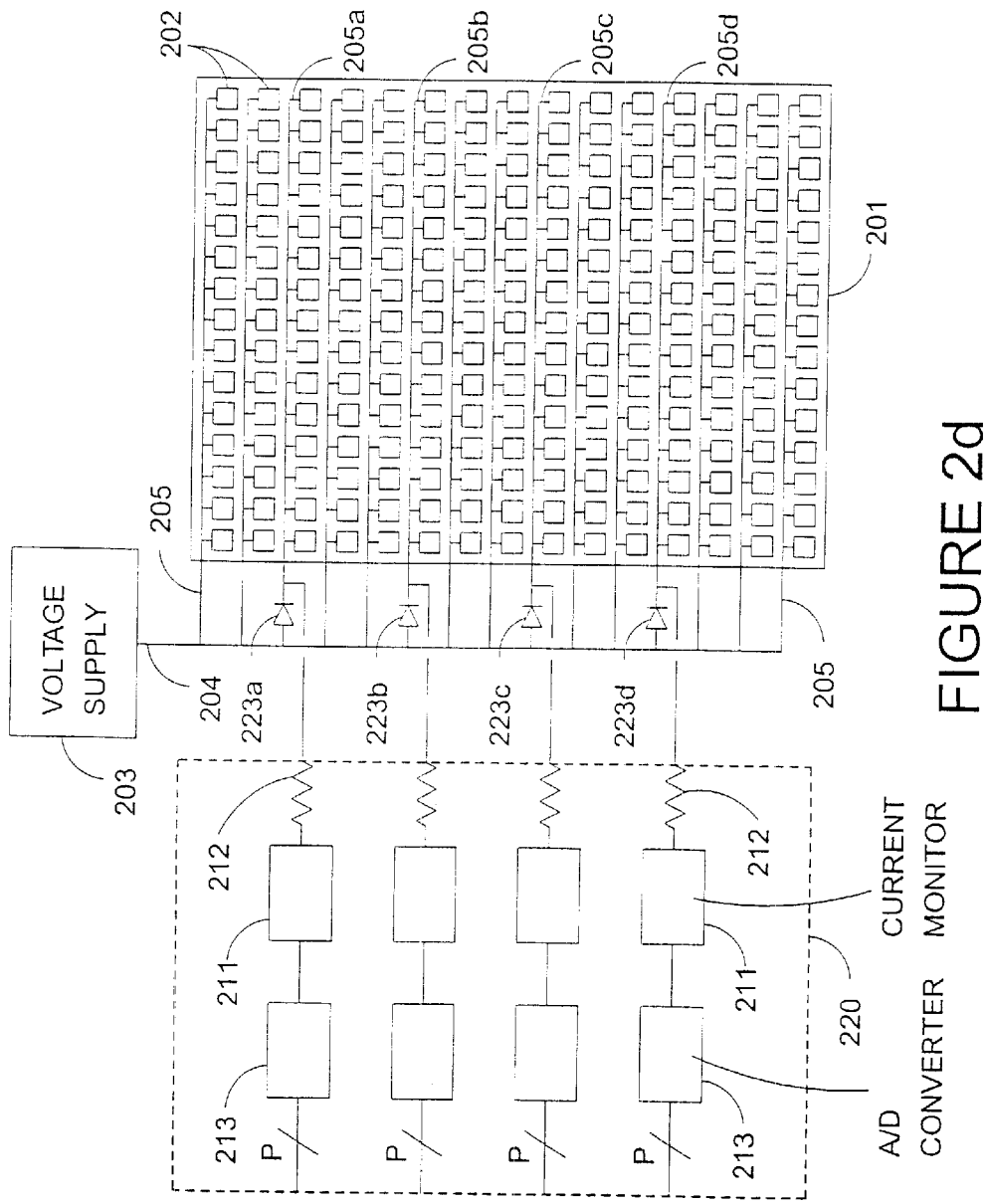
FIG. 2d illustrates a block diagram of the present invention having isolated power rails.

A further preferred embodiment is illustrated in FIG. 2d where the row rails 205a, 205b, 205c and 205d are all connected to the same voltage supply 203 however through diodes 223a, 223b, 223c and 223d respectively. The diodes 223a, 223b, 223c and 223d allow the row rails 205a, 205b, 205c and 205d to be monitored individually while avoiding interference by currents in the remaining row rails 205.

As was described with regard to FIG. 2a, all pixels 202 in an array 201 are normally reset simultaneously, though this need not be the case to implement the present invention. When it is desired to monitor the ambient light in a certain predetermined pattern on the imaging array 201, it is necessary to measure the leakage currents $I_{PL}$ flowing through the pixels 202 that are contiguous with that pattern. In such a circumstance, only the pixels 202 which are contiguous with that pattern can be reset at one point in time, allowing for the simple measurement of the leakage current to all pixels 202 that are being reset.

In addition, though all pixels 202 are shown as being connected to the voltage supply 203 through the row rail 205, other arrangements are possible. Examples of some such patterns are illustrated in FIGS. 4a to 4d which each show pixels 402 being laid out in an array 401 of 15 rows by 15 columns.

Figure 4A:
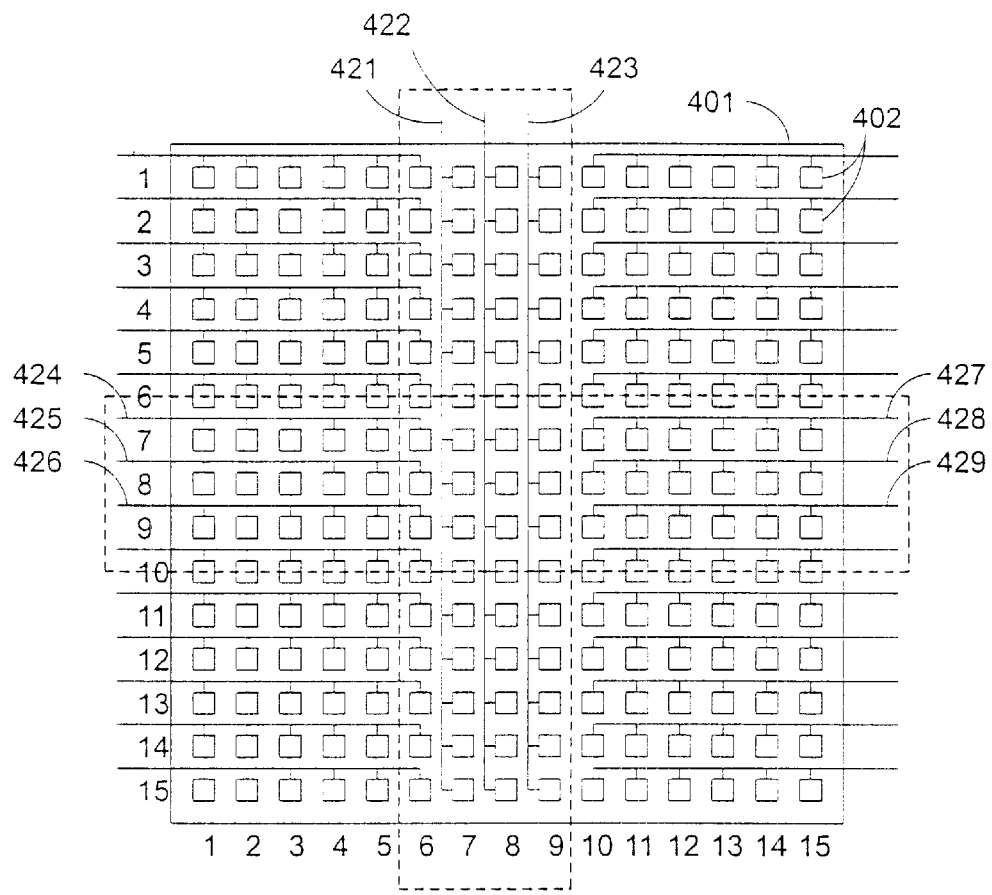
FIGS. 4a, 4b, 4c and 4d illustrate various possible layouts for the imaging array for the detection of ambient light in specific areas of an array.

If it is desired to measure the ambient light level on the array 401 using only the center rows and columns for instance rows 7 to 9 and columns 7 to 9, then the voltage supply to these rows and columns must be isolated from the remaining rows and columns in order to monitor the leakage currents while the pixels 402 are being reset. FIG. 4a, illustrates one such configuration wherein the pixels 402 in column 7 are connected to a power rail 421, the pixels 402 in column 8 are connected to a power rail 422 and the pixels 402 in column 9 are connected to a power rail 423. In addition, the pixels 402 in row 7 that are in columns 1 to 6 are connected to a rail 424, the pixels 402 in row 8 that are in columns 1 to 6 are connected to a rail 425, the pixels 402 in row 9 that are in columns 1 to 6 are connected to a rail 426, the pixels 402 in row 7 that are in columns 10 to 15 are connected to a rail 427, the pixels 402 in row 8 that are in columns 10 to 15 are connected to a rail 428, the pixels 402 in row 9 that are in columns 10 to 15 are connected to a rail 429. In addition, rails 424 and 427 may be connected together, rails 425 and 428 may be connected together, and rails 426 and 429 may be connected together. Such a configuration would allow a current monitor to be connected to each of the rails 421 to 426 in order to measure the leakage currents in the pixels 402 in rows 7 to 9 and columns 7 to 9 which results in a measurement of the ambient light falling in a cross pattern on the array 401.

Figure 4B:
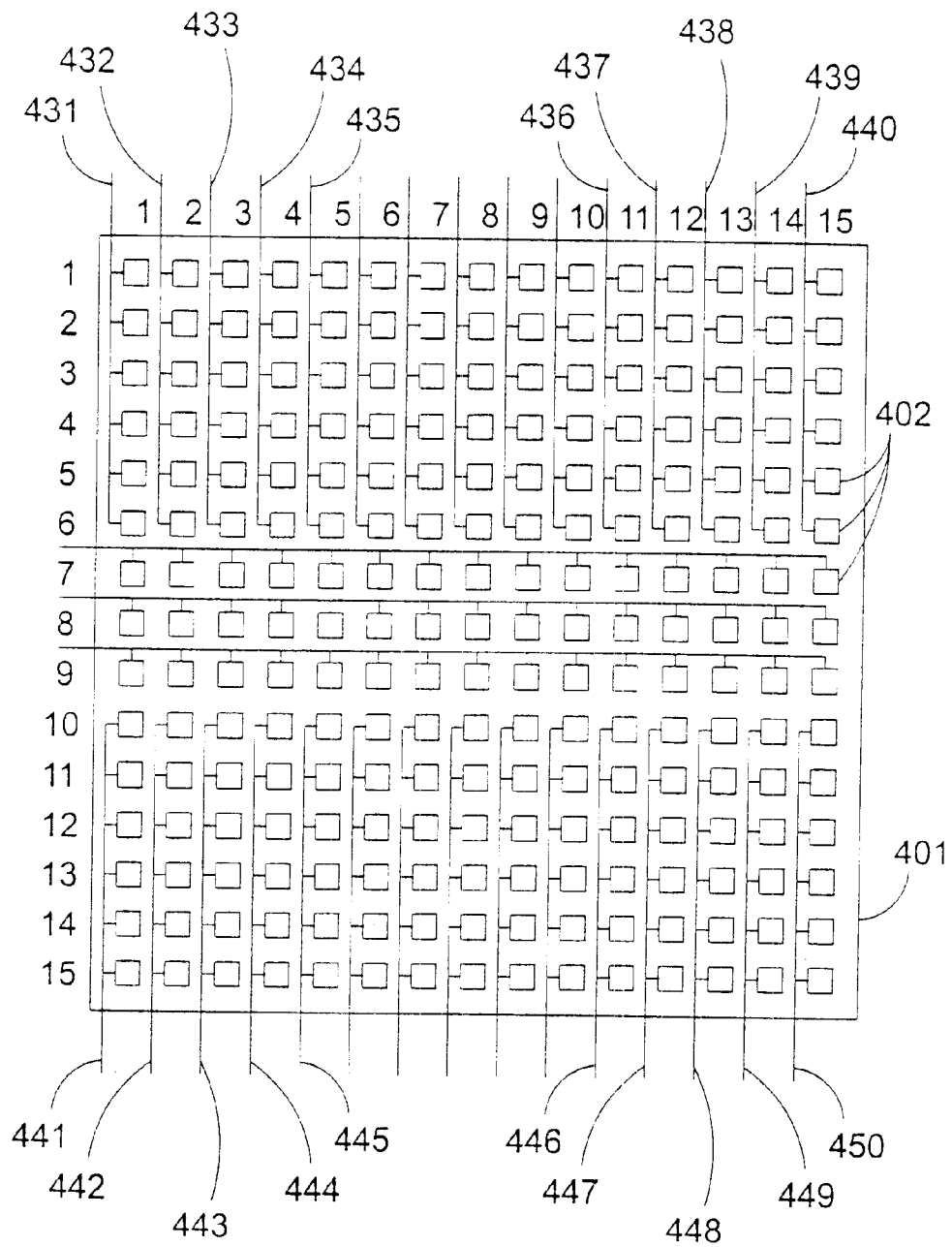

Similar results would be achieved if the power rails for the pixels 402 in rows 7 to 9 carried across the entire array 401 while the power rails for the pixels 402 in columns 7 to 9 were interrupted for rows 7 to 9, as illustrated in FIG. 4b. In addition, the configurations in FIGS. 4a and 4b would allow ambient light measurements to be taken for the four corners of the array 401 if the leakage currents were measured on alternate power rails 431 to 450. The pixels 402 are connected to these power rails in the following manner: the pixels 402 in column 1 that are in rows 1 to 6 are connected to a rail 431 and the pixels 402 that are in rows 10 to 15 are connected to rail 441, the pixels 402 in column 2 that are in rows 1 to 6 are connected to a rail 432 and the pixels 402 that are in rows 10 to 15 are connected to rail 442, the pixels 402 in column 3 that are in rows 1 to 6 are connected to a rail 433 and the pixels 402 that are in rows 10 to 15 are connected to rail 443, the pixels 402 in column 4 that are in rows 1 to 6 are connected to a rail 434 and the pixels 402 that are in rows 10 to 15 are connected to rail 444, and the pixels 402 in column 5 that are in rows 1 to 6 are connected to a rail 435 and the pixels 402 that are in rows 10 to 15 are connected to rail 445. Similarly, the pixels 402 in column 11 that are in rows 1 to 6 are connected to a rail 436 and the pixels 402 that are in rows 10 to 15 are connected to rail 446, the pixels 402 in column 12 that are in rows 1 to 6 are connected to a rail 437 and the pixels 402 that are in rows 10 to 15 are connected to rail 447, the pixels 402 in column 13 that are in rows 1 to 6 are connected to a rail 438 and the pixels 402 that are in rows 10 to 15 are connected to rail 448, the pixels 402 in column 14 that are in rows 1 to 6 are connected to a rail 439 and the pixels 402 that are in rows 10 to 15 are connected to rail 449, and the pixels 402 in column 15 that are in rows 1 to 6 are connected to a rail 440 and the pixels 402 that are in rows 10 to 15 are connected to rail 450. By monitoring the leakage currents in power rails 331 to 350, the ambient light level at the four corners of the array 401 may be determined.

Figure 4C:
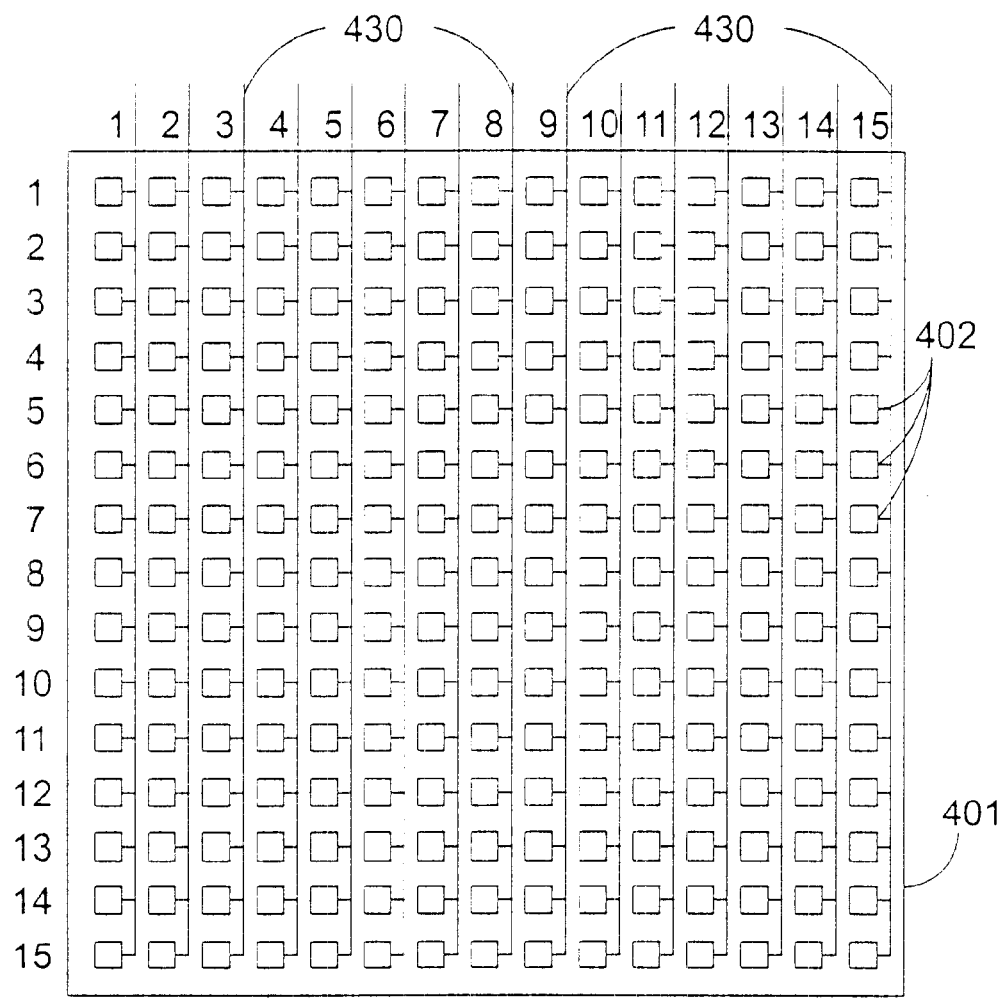

FIG. 4c illustrates an array 401 having a configuration wherein all of the pixels 402 in each column 1 to 15 are connected to a different power rail 430. This configuration allows for the selection of particular columns, rather than rows as illustrated in FIG. 2a, to measure the ambient light on the array 401.

Figure 4D:
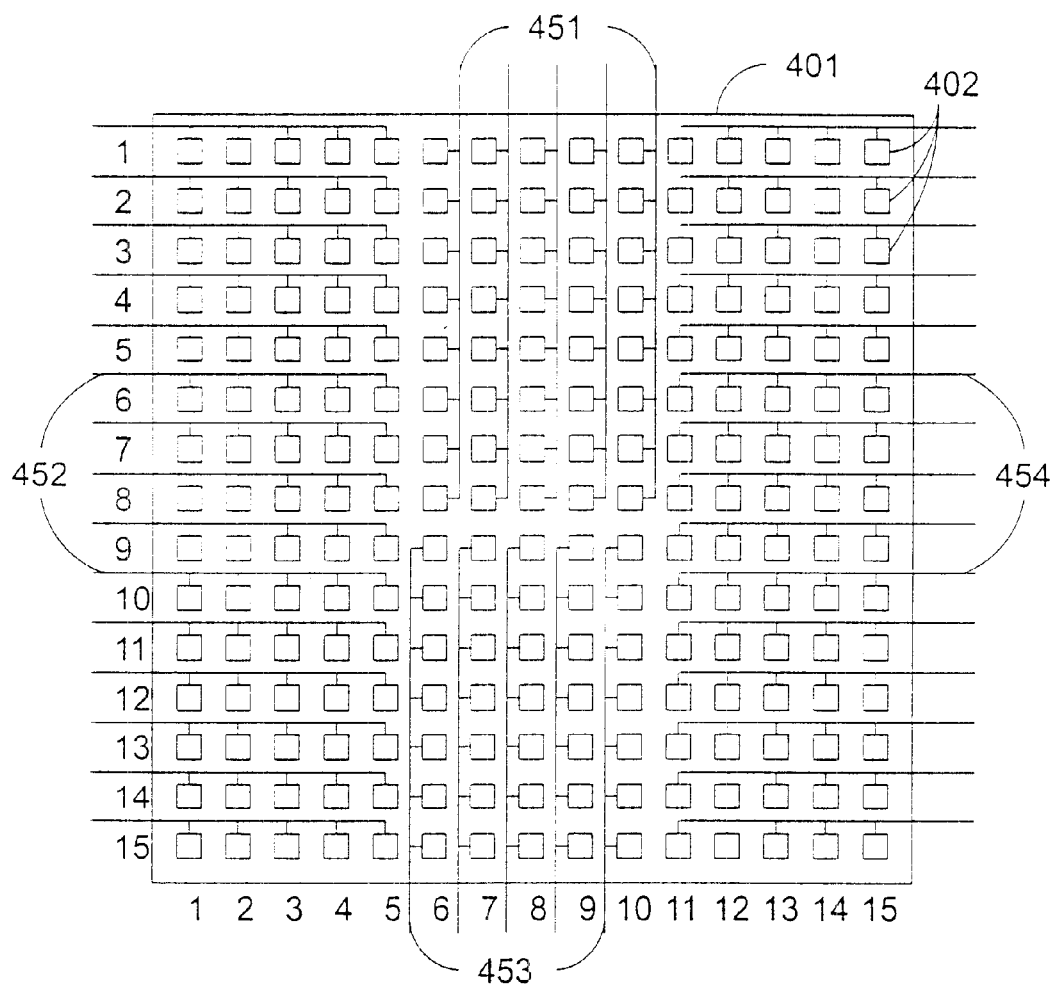

FIG. 4d illustrates yet another configuration wherein power rails 451 are connected to the row 1 to 8 pixels 420 in columns 6 to 10 and the power rails 453 are connected to the row 9 to 15 pixels 420 in columns 6 to 10 the power rails 451 and 453 extend across only half the imaging array 401. Each of the power rails 452 is connected to the column 1 to 5 pixels 420 for each of the rows 1 to 15, while each of the power rails 454 is connected to the column 11 to 15 pixels 420 for each of the rows 1 to 15 providing versatility in monitoring the leakage currents.

Figure 5:
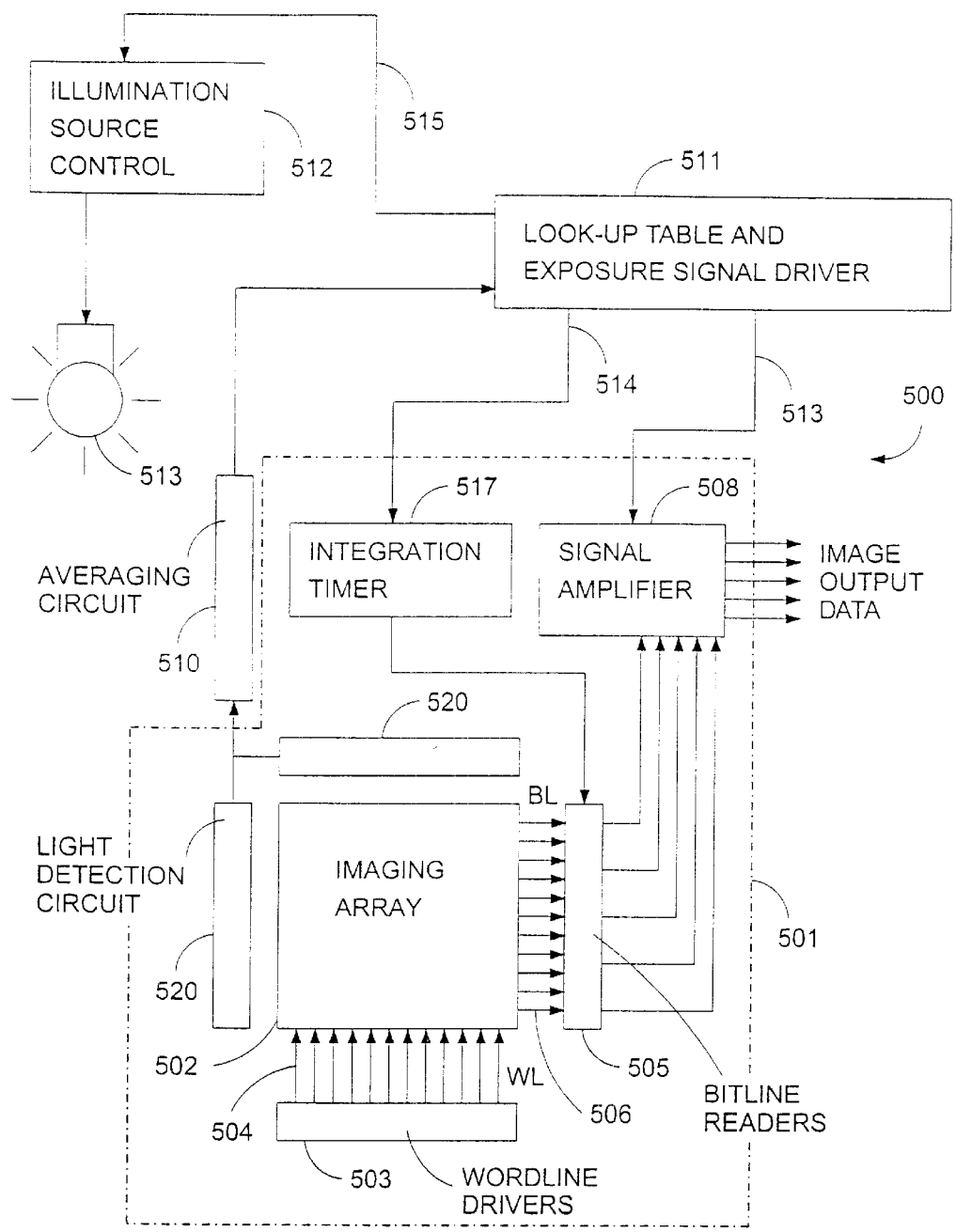
FIG. 5 illustrates a block diagram of an exposure control system with which the ambient light detector in accordance with the present invention may be used.

FIG. 5 illustrates the use of the present invention in an exposure controlled imager 500 as described in co-pending U.S. patent application Ser. No. 09/1689,368 filed on Oct. 12, 2000 which is incorporated herein by reference. The imaging circuit 501 which is located on a wafer or die and which is represented by broken lines, normally includes an imaging array 502, wordline drivers 503 and wordlines 504, bitline readers 505 and bitlines 506, an integration timer 507, and a signal amplifier 509. The bitline readers 505 are connected to the signal amplifier 508 which amplifies the bitline reader 505 signals to produce the image output data. Further, light detector circuits 520 are also located on the die 501 adjacent to the imaging array 502.

The imaging circuitry 501 on the die may further include an averaging circuit 510, a look-up table and signal driver 511 and an illumination source control 512. The signal driver 511 includes output lines 513 to 515 respectively for signals to control the signal amplifier 508, the integration timer 507 and the illumination control 512. The illumination control 512 is adapted to control an illumination source 513 may not necessarily be located on the imaging circuitry die 501.

Once the look-up table and signal driver 511 determines the proper values for the illumination source control signal, the integration time control signal, and the gain control signal, these signals are fed to illumination source controller 512, the integration timer 507 and the signal amplifier 508 respectively to adjust the brightness of the light source 513, the exposure time of the imaging array 502 and the gain of the amplifier 508, respectively.

The look-up table and signal driver 511 may consist of a microcontroller device such as the Strong-Arm SA-1110 and a read only memory programmed with data defining particular imaging needs in terms of light intensity, integration time, and signal gain in response to a measured level of ambient light. The sort of data contained therein would depend on the type of application the device was to be used for; for example a bar code reader would try to rely mostly on alterations of the integration time as this would be the power conscious method of ambient light adjustment.

Figure 6:
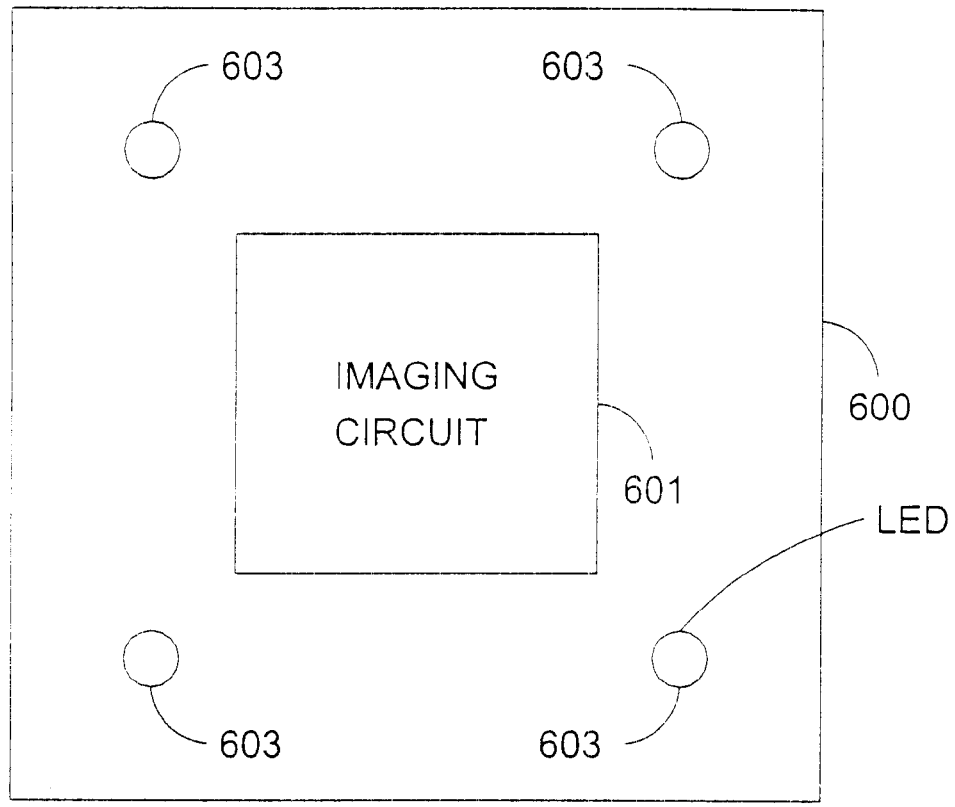
FIG. 6 illustrates the face of an image scanner.

The light source 513 may consist of any type of conventional light source that can be controlled in intensity. However, a particularly advantageous arrangement is illustrated in FIG. 6, which schematically illustrates the face of a scanner 600. The imaging circuit 601 is located at the center of the scanner face 602. One or more LED light sources 603 are positioned about the imaging circuit 601 to provide further lighting if required. In operation, the one or more LED's 603 may each be controlled by a separate line in order to turn each LED 603 OFF or ON as desired. For example, if an object or target is close to the scanner face 602, only one or two LED's might be turned ON; with the target a little further away, such as five or six inches, possibly three or four LED's 603 could be turned ON. Alternatively, the light source controller 512 could control the driving current to each LED 603, and increase or decrease the illumination from each LED 603 as required.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of determining the level of ambient light impinging on a pixel having a photodiode comprising:
   a. resetting the pixel; and
   b. detecting the current flow through the photodiode during the resetting step to determine the ambient light level.

2. A method of determining the level of ambient light impinging on a pixel having a photodiode as claimed in claim 1 wherein the resetting step (a) includes
   a.1. applying a reverse bias voltage across the photodiode.

3. A method of determining the level of ambient light impinging on a pixel having a photodiode as claimed in claim 2 wherein the detecting step (b) includes:
   b.1. detecting the current flow through a resistance in parallel to the photodiode.

4. A method of determining the level of ambient light impinging on a pixel having a photodiode as claimed in claim 3 wherein the detecting step (b) further includes:
   b.2. converting the detected current flow signal to a voltage signal; and
   b.3. converting the voltage signal to a digital signal.

5. A method of determining the level of ambient light on an imaging array of pixels having photodiodes comprising:
   a. resetting the pixels in the array; and
   b. detecting the current flow through the photodiodes in a selected number of pixels during the resetting step to determine the ambient light level.

6. A method of determining the level of ambient light impinging on an array of active pixels having photodiodes as claimed in claim 5 wherein the resetting step (a.) includes:
   a.1. applying a reverse bias voltage across the photodiodes.

7. A method of determining the level of ambient light impinging on an array of active pixels having photodiodes as claimed in claim 5 wherein the selected number of pixels are divided in one or more groups of pixels.

8. A method of detecting the level of ambient light impinging on an array of active pixels having photodiodes as claimed in claim 7 wherein the pixels in the imaging array are positioned in rows and columns.

9. A method of determining, the level of ambient light impinging on an array of active pixels having photodiodes as claimed in claim 8 wherein the pixels in each group are located in a predetermined row.

10. A method of determining the level of ambient light impinging, on an array of active pixels having photodiodes as claimed in claim 8 wherein the pixels in each group are located in predetermined column.

11. A method of determining the level of ambient light impinging on an array of active pixels having photodiodes as claimed in claim 8 wherein the pixels in each group are located in a specific pattern in the array.

12. A method of determining the level of ambient light impinging on an array of active pixels having photodiodes as claimed in claim 7 wherein detecting step (b.) includes:
    b.1 detecting the current flow through a resistance in parallel to the photodiodes in each group of pixels.

13. A method of determining the level of ambient light impinging on an array of active pixels having photodiodes as claimed in claim 11 wherein detecting step (b.) further includes:
    b.2. converting each detected current flow signal to a voltage signal; and
    b.3 converting each of the voltage signals to a digital signal.

14. A method of determining the level of ambient light impinging on an array of active pixels having photodiodes as claimed in claim 12 wherein detecting step (b.) further includes:
    b.4. combining the digital signals to provide a digital signal representative of the ambient light level.

15. A method of determining the level of ambient light on an imaging array of pixels having photodiodes comprising:
    a. resetting a selected number of pixels in the array; and
    b. detecting the current flow through the photodiodes in the selected number of pixels during the resetting step to determine the ambient light level.

16. A method of determining the level of ambient light impinging on an array of active pixels having photodiodes as claimed in claim 15 wherein the resetting step (a.) includes:
    a.1. applying a reverse bias voltage across the photodiodes.

17. A method of determining the level of ambient light impinging on an array of active pixels having photodiodes as claimed in claim 15 wherein the selected number of pixels are divided in one or more groups of pixels.

18. A method of determining the level of ambient light impinging on an array of active pixels having photodiodes as claimed in claim 15 wherein groups of pixels are reset sequentially.

19. In an imaging array of light sensitive pixels each having a photodiode and photodiode reset means adapted to apply a predetermined reset voltage across the photodiode and one or more power rails each connected to a group of one or more of the pixels for supplying power to the pixels, apparatus for determining ambient light comprising:
    Current monitoring means for measuring current flow in the photodiodes of selected pixels as the photodiodes are being reset for determining the ambient light.

20. Apparatus for measuring ambient light as claimed in claim 19 wherein the current monitoring means includes one or more current monitors each connected to at least one of the power rails for monitoring the current flow in the photodiodes connected to the power rail.

21. Apparatus for measuring ambient light as claimed in claim 20 comprising analog-to-digital converter means coupled to each of the current monitors to provide a digital signal representative of the ambient light.

22. Apparatus for measuring ambient light as claimed in claim 21 comprising resistor means couple between the current monitor and the power rail.

23. Apparatus for measuring ambient light as claimed in claim 22 wherein the current monitor comprises a current-to-voltage converter.

24. Apparatus for measuring ambient light as claimed in claim 23 wherein the current-to-voltage converter comprises an op-amp having an inverting input terminal coupled to the resistor means, a non-inverting input terminal adapted to be coupled to a reference voltage and an output terminal, the output terminal being coupled to the inverting input terminal through a further resistor means.

25. Apparatus for measuring ambient light as claimed in claim 19 wherein the imaging array and the current monitoring means are integrated on the same die.

26. Apparatus for measuring ambient light as claimed in claim 19 wherein the pixels in the imaging array are positioned in rows and columns and wherein the selected pixels are located in inner rows and columns.

27. Apparatus for measuring ambient light as claimed in claim 19 wherein the pixels in the imaging array are positioned in rows and columns and wherein the selected pixels are located in outer rows and columns.

28. Apparatus for measuring ambient light as claimed in claim 19 wherein the pixels in the imaging array are positioned in rows and columns and wherein the selected pixels are located in one or more columns.

29. Apparatus for measuring ambient light as claimed in claim 19 wherein the pixels in the imaging array are positioned in rows and columns and wherein the selected pixels are located in one or more rows.

30. Apparatus for measuring ambient light as claimed in claim 19 wherein the pixels in the imaging array are positioned in rows and columns and wherein the power rail is connected to the selected pixels arranged in a specific pattern in the array.

31. Apparatus for measuring ambient light as claimed in claim 19 wherein the pixels in the imaging array are positioned in rows and columns and wherein the power rails are connected to rows of pixels.

32. Apparatus for measuring ambient light as claimed in claim 19 wherein the pixels in the imaging array are positioned in rows and columns and wherein the power rails are connected to columns of pixels.

33. Apparatus for measuring ambient light as claimed in claim 19 wherein each pixel includes a photodiode and a reset switch.

34. Apparatus for measuring ambient light as claimed in claim 33 which further includes means for controlling the reset switches to reset individual groups of pixels sequentially.

35. Apparatus for measuring ambient light as claimed in claim 19 wherein all pixels are coupled to the same power supply.

36. Apparatus for measuring ambient light as claimed in claim 19 wherein the pixels in each group are adapted to be connected to the power supply through a separate power rail.

37. Apparatus for measuring ambient light as claimed in claim 36 wherein each separate rail is adapted to be connected to a separate power supply.

38. Apparatus for measuring ambient light as claimed in claim 36 wherein each separate rail is adapted to be connected to the power supply through a diode.

39. A system for controlling the output signal during image capture of an object by an imager having an imaging array of light sensitive pixels each having a photodiode and photodiode reset means adapted to apply a predetermined reset voltage across the photodiode and one or more power rails each connected to one or more pixels on a die comprising:

ambient light detection means located on the die adjacent to the imaging array for sensing the ambient light on the object;

means for generating an electrical signal representative of the ambient light;

means for sampling the representative electrical signal; and means for controlling the output signal as a function of the sampled representative signal.

40. A system for controlling the output signal during image capture of an object by an imager having an imaging array on a die as claimed in claim 39 wherein the ambient light detection means comprises current monitoring means for measuring current flow in the photodiodes of selected pixels as the photodiodes are being reset for determining the ambient light.

41. A system for controlling the output signal during image capture of an object by an imager having an imaging array on a die as claimed in claim 40 wherein the current monitoring means includes one or more current monitors each connected to at least one power rail for monitoring the current flow in the photodiodes connected to the power rail.

42. A system for controlling the output signal during image capture of an object by an imager having an imaging array on a die as claimed in claim 41 wherein the electrical signal generating means includes analog-to-digital converter means coupled to each of the current monitors to provide a digital signal representative of the ambient light.

43. A system for controlling the output signal during image capture of an object by an imager having an imaging array on a die as claimed in claim 42 comprising resistor means couple between the current monitor and the power rail.

44. A system for controlling the output signal during image capture of an object by an imager having an imaging any on a die as claimed in claim 43 wherein the current monitor comprises a current-to-voltage converter.

45. A system for controlling the output signal during image capture of an object by an imager having an imaging array on a die as claimed in claim 44 wherein the current-to-voltage converter comprises an op-amp having an inverting input terminal coupled to the resistor means, a non-inverting input terminal adapted to be coupled to a reference voltage and an output terminal, the output terminal being coupled to the inverting input terminal through a further resistor means.

46. A system for controlling the output signal during image capture of an object by an imager having an imaging array on a die as claimed in claim 40 wherein the means for controlling the output signal as a function of the sampled representative signal comprises a look-up table having a variety of control signal levels as a function of light intensity and a signal driver to control the output signal.

47. A system for controlling the output signal during image capture of an object by an imager having an imaging array on a die as claimed in claim 46 comprising integrator timer means coupled to the signal driver to control the exposure time of the imaging array to the object illumination.

48. A system for controlling the output signal during image capture of an object by an imager having an imaging array on a die as claimed in claim 46 comprising illumination source control means coupled to the signal driver to control the illumination intensity.

49. A system for controlling the output signal during image capture of an object by an imager having an imaging array on a die as claimed in claim 46 comprising amplifier gain control means coupled to the signal driver to control the amplification of the output signal.

50. A system for controlling the output signal during image capture of an object by an imager having an imaging array on a die as claimed in claim 47 comprising illumination source control means coupled to the signal driver to control the illumination intensity.

51. A system for controlling the output signal during image capture of an object by an imager having an imaging array on a die as claimed in claim 50 comprising amplifier gain control means coupled to the signal driver to control the amplification of the output signal.

52. A system for controlling the output signal during image capture of an object by an imager having an imaging array on a die as claimed in claim 40 comprising a light source for illuminating the object to be imaged.

53. A system for controlling the output signal during image capture of an object by an imager having an imaging array on a die as claimed in claim 52 in which the light source comprises one or more LED's positioned about the scanning array.

54. A system for controlling the output signal during image capture of an object by an imager having an imaging array on a die as claimed in claim 52 in which the light source comprises at least one LED positioned at one or more comers of the scanning array.

* * * * *

UNITED STATES PATENT AND TRADEMARK OFFICE
CERTIFICATE OF CORRECTION

PATENT NO. : 6,469,289 B1 Page 1 of 1
DATED : October 22, 2002
INVENTOR(S) : John Scott-Thomas et al.

It is certified that error appears in the above-identified patent and that said Letters Patent is hereby corrected as shown below:

<u>Column 8,</u>
Line 23, please delete "09/1689,368", and insert therefor -- 09/689,368 --.

<u>Column 10,</u>
Line 2, after "impinging", please delete "," (comma).

Signed and Sealed this

Eighth Day of April, 2003

JAMES E. ROGAN
*Director of the United States Patent and Trademark Office*